United States Patent Office 3,297,582
Patented Jan. 10, 1967

3,297,582
TRICHLOROMONOFLUOROMETHANE-
CONTAINING COMPOSITIONS
Peter Pawlyk, Wyncote, Pa., assignor to Pennsalt Chemicals Corporation, Philadelphia, Pa., a corporation of Pennsylvania
No Drawing. Original application June 10, 1963, Ser. No. 286,479. Divided and this application Oct. 18, 1965, Ser. No. 508,410
6 Claims. (Cl. 252—188.3)

This is a division of Serial No. 286,479, filed June 10, 1963.

This invention relates to inhibited compositions containing chlorofluorohydrocarbons and particularly to stabilized trichloromonofluoromethane compositions containing polyhydroxyl compounds or polyethers.

As discussed below, trichloromonofluoromethane is useful in alcohol and polyol containing blends particularly aerosol and foamed plastic formulations. However, a deleterious interaction occurs in such formulations, rendering their shelf life inadequate. The present invention embodies the discovery that replacement of the trichloromonofluoromethane in such formulations with novel compositions comprising trichloromonofluoromethane and 1-methoxy-4-propenyl benzene results in alcohol and polyol-containing formulations having substantially increased shelf life.

Trichloromonofluoromethane has found extensive use as a blowing agent in the production of foamed plastics and especially in the production of polyurethane and epoxy foamed products. When two polymerizable materials are mixed together with suitable catalysts in the presence of trichloromonofluoromethane, the trichloromonofluoromethane blowing agent is vaporized due to heat liberated during the polymerizing reaction. By expanding, the trichloromonofluoromethane creates a plastic foam which is characterized on hardening by a large number of closed cells each containing vaporized trichloromonofluoromethane or by an open cell foam.

In addition to providing a strong material of extremely low density, the trichloromonofluoromethane acts as an excellent thermal insulator and causes the plastic foams to have extremely low thermal conductivities. Resulting foam products are therefore most useful in applications which require high strength and low density such as in flotation units for boats, in stiffening members for aircraft, and also in refrigeration and other applications requiring highly efficient thermal insulating materials. Even in those cases where a flexible foamed plastic cushioning material is desired and foams are essentially composed of an open cell structure, the use of trichloromonofluoromethane offers substantial advantages in the control of foam density and of cell size.

The polyurethane foams which currently enjoy a major percentage of the foamed plastic markets are manufactured by the interaction of a polyisocyanate with an active hydrogen-containing polymer component which is herein termed a polyol. Commercial polyols include a wide variety of polyesters and polyethers.

The isocyanate and the polyol are stored separately and a catalyst is generally included with the polyol component. In order to minimize storage difficulties, it is highly desirable that the trichloromonofluoromethane blowing agent be combined with the polyol. Such combination not only permits a reduction in the number of containers or storage tanks which must be maintained, but in addition solves handling problems which are caused by the physical properties of the polyol and of the trichloromonofluoromethane. Polyols are generally thick, viscous liquids which cause considerable difficulty in pumping and the clogging of pipelines and equipment components through which they must flow. Trichloromonofluoromethane is a highly volatile liquid, boiling at 74.8° F. and consequently must be stored in tightly closed containers which have been carefully leak tested. Additionally, since the ambient temperature in most locations will alternately fluctuate from below the boiling point of trichloromonofluoromethane to above that boiling point, the containers for the blowing agent must be designed to withstand alternately pressures of as high as 24.26 p.s.i.g. (the vapor pressure of trichloromonofluoromethane at 130° F.) and vacuums of as high as 26.01 inches of mercury (the vapor pressure of trichloromonofluoromethane at −10° F.). The difficulties caused by the physical properties of the polyol and the trichloromonofluoromethane can be solved by mixing them together in the proportions in which they will be utilized in the production of the foamed plastic. Trichloromonofluoromethane has a particularly low viscosity (about .439 centipoise at 70° F.) and therefore substantially reduces the objectionable viscosity of the polyol or polyether. On the other hand, the polyols, having virtually negligible vapor pressures at room temperature, are capable of blending with trichloromonofluoromethane to form mixtures which have vapor pressures much lower than those of the pure trichloromonofluoromethane. These mixtures may be readily pumped with minimal difficulty from clogging of line and may be stored in relatively light containers considerably less expensive than those which would be needed for storage of pure trichloromonofluoromethane.

As a further substantial advantage, the mixing of trichloromonofluoromethane with the polyol greatly facilitates the measurement of these components into the reaction apparatus in which the foamed plastic is produced. Pure trichloromonofluoromethane, being volatile, frequently "flashes" in volumetric metering apparatus and thereby causes major inaccuracies in measurement. This flashing or vaporization in measuring equipment may be minimized by chilling of the trichloromonofluoromethane but such chilling requires the use of comparatively elaborate and expensive refrigeration apparatus and in addition the chilled blowing agent must be warmed by the heat of reaction before foaming can take place. Expenditure of some of the heat evolved from the reaction for warming the chilled blowing agent to its boiling point may cause a reduction in the amount of foaming and a consequent objectionable increase in the density and thermal conductivity of the finished plastic.

When the polyol and trichloromonofluoromethane are mixed together in order to achieve the above-described advantages, a further difficulty is noted. A reaction takes place between the polyol and the trichloromonofluoromethane as indicated by a color change, and frequently by an increase in viscosity. For example, mixtures of from 30 to 50% by weight of trichloromonofluoromethane with the amine-based, slightly alkaline polyol N,N,N′,N′ - tetrakis(2 - hydroxypropyl)ethylenediamine tend to darken and substantially increase in viscosity on standing even at room temperature. Heating to 130° F. for 24 hours causes the mixture to darken considerably and further increases the viscosity. Most important, when the resulting solution is incorporated into a rigid polyurethane foam, the resulting material is highly colored and has such low strength as to be of no practical value.

Tests indicate that the hydroxyl number of the polyol decreases during the reaction and the weakness of the resulting foam would seem to be explained by the decrease in the number of hydroxyl groups available for reaction and the consequent reduction in the degree of cross-polymerization of the finished foam. However, it should be understood that the present invention is not restricted to either the above reaction mechanism or to any other theory which may be advanced to explain the phenomenon observed.

The novel compositions of the present invention will preferably contain from about 0.2 to 2.0 percent of 1-methoxy-4-propenylbenzene and most preferably from 0.5 to about 1.5 percent by weight based on the weight of the trichloromonofluoromethane.

Use of the new compositions permits control of the objectionable reaction which occurs between the trichloromonofluoromethane and alcohols or polyols of a wide variety of structures. Polyols now commercially used in plastic foam manufacture may be broadly grouped into two classifications—the amine-based varieties and the non-amine-based varieties. Amine-based polyols, especially a poly(hydroxyalkyl)polyamine containing from 4 to 5 hydroxyl groups, are frequently employed because they are readily produced commercially and therefore are relatively low in cost, they have a high degree of polyfunctionality in general, and they are frequently self-catalyzed, that is, no additional catalyst need be added to produce the reaction which results in the foamed plastic. The more common amine-based polyols include: N,N,N',N'-tetrakis(2-hydroxypropyl)ethylenediamine sold under the trade name Quadrol; amine-based polyether tetrols including that sold under the trade name Pluracol EDP-500; and the polyethers sold under the trade name Niax pentols having average molecular weights in the area of from 400 to 590 and specific gravities from 1.032 to about 1.045, average hydroxyl numbers of from 480 to about 700 mg. of KOH per gram and including compounds of the structure:

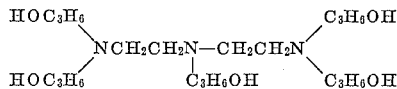

The non-amine-based polyols include those which may be subclassed as glycols, including glycerine, ethylene oxide derivatives, and glycols in general; those which may be classed as sorbitol derivatives including polyoxypropylene sorbitols and the sorbitol polyethers which are hexafunctional condensation products of sorbitol and propylene oxide such as the sorbitol polyethers covering a range of hydroxyl numbers from 100 to about 640; the derivatives of pentaerithythrol including those derivatives characterized by four secondary hydroxyl groups each joined to a central carbon atom by an oxy-alkylene chain and sold under the trade name Pluracol PeP tetrols; and those polyols derived from methyl glucoside by hydroxypropylation or by dihydroxypropylation of the methyl glucoside.

An additional seriously deleterious effect of the interaction of polyols with trichloromonofluoromethane is the "poisoning" of the catalysts which will usually be contained within the polyol-trichloromonofluoromethane mixture. Most catalysts for the preparation of polyurethane foams are based on tertiary amines including, for example, N-ethylmorpholine, N,N'-dipropylpiperazine, N-methylmorpholine, 1,1,3,3-tetramethylguanidine, N,N,N',N'-tetramethyl-1,3-butanediamine, triethylamine, triethylenediamine, and trimethylpiperazine. These catalysts are alkaline in character and since they are used in relatively small amounts as compared to the weight of the polyol and trichloromonofluoromethane, a small amount of acid produced by the reaction between the polyol and trichloromonofluoromethane will greatly affect the activity of the catalyst contained in the mixture. Neutralization of the catalyst and the resulting insufficient catalysis will produce a weak foam having insufficient cross linkage, and under certain circumstances may fail to produce appreciable polymerization.

Virtually all of the above types and specific compounds exhibit objectionable reactions over a period of time when mixed with trichloromonofluoromethane particularly at elevated ambient temperatures. The newly discovered stabilizer of the present invention is effective to greatly reduce the rate at which these undesirable reactions progress and in many cases to virtually eliminate the objectionable reaction.

The valuable action of 1-methoxy-4-propenylbenzene is particularly unexpected in view of the inoperability of a number of compounds having similar chemical structures. This is illustrated in Example 1 which shows the results of a series of tests conducted to demonstrate the efficacy of the inhibiting agent of the present invention on the trichloromonofluoromethane-polyol reaction.

It should be understood that although these stabilized trichloromonofluoromethane - containing compositions probably find their greatest use in the manufacture of foamed plastics, their utility is not limited to this use and extends into a wide variety of formulations which contain trichloromonofluoromethane, including pressurized packages in which the trichloromonofluoromethane acts as a pressure diluent or solvent, cleaning and degreasing formulations in which the trichloromonofluoromethane acts as a cleaner, and to any other uses in which the greatly increased stability of the compositions of the present invention is of value.

In order to evaluate the relative effectiveness of a wide variety of potential stabilizers for trichloromonofluoromethane, a test procedure was set up which consisted of adding a quantity of N,N,N'N'-tetrakis-2-hydroxypropylethylenediamine, a widely used polyol sold under the name Quadrol. To the Quadrol was added a weighed quantity of trichloromonofluoromethane containing, the potential stabilizer in amounts varying from about 0.5 to about 5.0% by weight based on the weight of the trichloromonofluoromethane. The mixture was then sealed into glass aerosol type pressure bottles, thoroughly agitated by hand, and allowed to stand for several hours. After standing, those compounds which are insoluble were eliminated by visual observation of the mixtures through the clear sides of the aerosol bottles. Compounds exhibiting low solubility included thiourea and dibutylthiourea. The latter compound was soluble to several percent in trichloromonofluoromethane at about 70° F. but was practically insoluble in the temperature range below 32° F., a range commonly encountered by shipments of foamed components made during the wintertime. Efforts to solubilize thiourea and dibutylthiourea with coupling solvents including dimethyl sulfoxide and Cellosolve (ethylene glycol monoethyl ether) were not successful.

A further group of compounds was rejected as potential stabilizers because the compounds imparted either objectionable odor or color to the Quadrol solution. These included mixed amylenes which colored the trichloromonofluoromethane - Quadrol system a faint greenish-yellow and imparted an unpleasant sour odor to the blend.

The samples were next tested by measuring their "pH" value with a conventional Beckman Model #72 pH meter with a combination glass and reference electrode. These values, most of which were in the range from about 10.0 to 11.0, were recorded for comparison with later measurements, and the samples were placed in 70° F. (± approximately 5° F.) storage. A duplicate set of samples was placed in 130° F. storage, and controls consisting of trichloromonofluoromethane with Quadrol and without stabilizer were kept at each of the temperature levels.

After some testing experience was gained, it was found that samples deteriorated relatively rapidly once the pH had dropped to a level below 9.0. For this reason, a pH of 9.0 was chosen as a "failure point" and this notation is used in the tabulations which summarize the results of the examples in this application.

It was found that a number of prospective stabilizing compounds exhibited no effect whatever and the trichloromonofluoromethane-Quadrols stabilized with these compounds reached pH's below 9.0 as rapidly or even more rapidly than did the unstabilized controls. Among the potential stabilizing compounds which were rapidly eliminated as being of no appreciable effectiveness were benzaldehyde, sodium hexylene glycol monoborate, guanidine carbonate, methyl butynol, methyl pentynol, acetone, acetone/benzaldehyde mixtures, nitromethane, isophorone, urea, urea/benzaldehyde mixtures, diethylhydroxylamine, hydroxyquinone, mercaptobenzothiazole, N-dodecylmercaptan, N-dioctylmercaptan.

With all of the above potential stabilizers eliminated from consideration, it became clear that the most promising group consisted of the general class of compounds known as pine chemicals or, more specifically, terpenes and compounds closely associated in structure to terpenes. Most of these compounds added little or no color to the trichloromonofluoromethane-Quadrol test blend and imparted only tolerable odor to the blend. In addition, almost all of this class of compounds exhibited some stabilization and reduction in the undesirable pH drop over a given period of time.

The results of tests on this promising class of compounds are shown in the examples which follow. These results indicate that a single compound, although closely analogous in structure to other compounds within the pine-derivative family, exhibited an effectiveness in the stabilization of the trichloromonofluoromethane-Quadrol blend which was more than twice as high as that of any other compound tested. The compound which showed this high degree of effectiveness was 1-methoxy-4-propenylbenzene.

and other monocyclic compounds, with the remainder being various alcohols and bicyclic compounds.

Yarmor F is approximately composed of 65 to 70% by weight of alpha-terpineol, 10 to 15% of borneol and fenchyl alcohols, 10% of dihydro-alpha-terpineol, and other tertiary alcohols, 5% estragole, and about 5 to 10% of ketones.

Alpha-terpineol is composed principally of p-1-menthen-8-ol and other tertiary monocyclic alcohols.

The 1-methoxy-4-propenylbenzene used in the tests was more than 93% pure, had a specific gravity of about 0.983 at 250/25° C., a refractive index of 1.550 at 25° C., a minimum boiling point of 232–234° C. and a maximum boiling point of 235–240° C.

EXAMPLES 1 THROUGH 24

A number of potential inhibitors selected from the promising pine-derivative family are tested at 130° F. in order to accelerate the reaction between the polyol and the trichloromonofluoromethane. To further maximize the occurrence of the undesirable reaction between trichloromonofluoromethane and the polyol, the weight ratio of 1:1 between the polyol and the trichloromonofluoromethane is used rather than the approximately 10:1 to 2:1 ratios used in most commercial foam blowing systems.

*Table I*

| Example | Inhibitor | Weight Percent | pH | | | | | |
|---|---|---|---|---|---|---|---|---|
| | | | At 0 hrs. | At 192 hrs. | At 315 hrs. | At 504 hrs. | At 576 hrs. | At 1,344 hrs. |
| 1 | Control | 0 | 10.3 | Failure | Failure | Failure | Failure | Failure |
| 2 | α-Pinene | 0.5 | 10.0 | Failure | Failure | Failure | Failure | Failure |
| 3 | do | 1.0 | 10.0 | 9.0 | Failure | Failure | Failure | Failure |
| 4 | Dipentene 122 | 0.5 | 10.0 | 9.10 | Failure | Failure | Failure | Failure |
| 5 | do | 1.0 | 10.3 | 9.38 | 9.2 | Failure | Failure | Failure |
| 6 | Camphene | 0.3 | 10.2 | Failure | Failure | Failure | Failure | Failure |
| 7 | do | 0.5 | 10.3 | Failure | Failure | Failure | Failure | Failure |
| 8 | do | 1.0 | 10.3 | 9.05 | Failure | Failure | Failure | Failure |
| 9 | do | 2.5 | 10.2 | Failure | Failure | Failure | Failure | Failure |
| 10 | 1-methoxy-4-propenylbenzene | 0.5 | 10.1 | 9.80 | 9.60 | 9.52 | 9.47 | 9.38 |
| 11 | do | 1.0 | 10.1 | 9.70 | 9.50 | 9.36 | 9.33 | 9.24 |
| 12 | Steam distilled terpentine | 0.5 | 10.1 | Failure | Failure | Failure | Failure | Failure |
| 13 | do | 1.0 | 10.2 | Failure | Failure | Failure | Failure | Failure |
| 14 | Para cymene | 1.3 | 10.4 | Failure | Failure | Failure | Failure | Failure |
| 15 | do | 2.4 | 10.4 | Failure | Failure | Failure | Failure | Failure |
| 16 | Sulfated β-pinene | 1.3 | 10.2 | Failure | Failure | Failure | Failure | Failure |
| 17 | do | 2.4 | 10.3 | 9.2 | Failure | Failure | Failure | Failure |
| 18 | Solvenol #2 | 1.3 | 10.3 | 9.2 | 9.04 | Failure | Failure | Failure |
| 19 | do | 2.4 | 10.1 | 9.1 | Failure | Failure | Failure | Failure |
| 20 | Yamor F | 1.3 | 10.5 | 9.4 | 9.10 | Failure | Failure | Failure |
| 21 | do | 2.4 | 10.5 | 9.2 | Failure | Failure | Failure | Failure |
| 22 | α-Terpineol | 0.5 | 10.4 | Failure | Failure | Failure | Failure | Failure |
| 23 | do | 1.0 | 10.5 | Failure | Failure | Failure | Failure | Failure |
| 24 | do | 1.5 | 10.5 | Failure | Failure | Failure | Failure | Failure |

Testing is done according to the procedure described previously in this application, by mixing the trichloromonofluoromethane and the Quadrol, adding a quantity of the potential inhibitor and sealing the mixture into glass aerosol type pressure bottle. The pH values were measured as described previously and the results were found to be as tabulated below.

A number of the compounds tested were commercial grades of pine derivatives. Descriptions of these commercial compounds follow:

Alpha-pinene consists of about 85% alpha-pinene and 12% camphene with the remainder being dipentene and other monocyclic hydrocarbons.

Dipentene No. 122 consists of about 51% by weight dipentene, 17% p-cymene, 14% p-menthane, 5% terpinolene, 3% alpha-pinene and 5% alpha-terpinene, with the remainder being various monocyclic compounds.

Solvenol No. 2 is a mixture roughly composed of 30 to 40% by weight of dipentene, 20 to 25% by weight of p-menthane and p-menthenes, 10 to 20% of terpinolene It will be seen from the above tabulation that of all of the compounds tested only one compound effectively inhibited the pH drop beyond the 504 hour point, and that this compound was the 1-methoxy-4-propenylbenzene of the present invention.

EXAMPLES 25 THROUGH 30

In order to determine whether the inhibitor of the present invention maintained its superiority when used in connection with commercial ratios of polyol to trichloromonofluoromethane, a series of tests was run at a test temperature of 130° F. using a test mixture composed of 2 parts by weight of Quadrol polyol with one part by weight of trichloromonofluoromethane. The procedures were identical with those used in the preceding examples. The test results, as tabulated below, demonstrate that 1-methoxy-4-propenylbenzene is a superior inhibitor for commercial mixtures of polyols with trichloromonofluoromethane.

Table II

| Example | Inhibitor | Weight Percent | pH | | | | |
|---|---|---|---|---|---|---|---|
| | | | At 0 hrs. | At 192 hrs. | At 504 hrs. | At 576 hrs. | At 1,344 hrs. |
| 25 | Control | 0 | 10.45 | Failure | Failure | Failure | Failure |
| 26 | 1-methoxy-4-propenylbenzene | 1.0 | 10.45 | 10.00 | 9.48 | 9.40 | 9.30 |
| 27 | Terpineol #318 | 0.5 | 10.80 | Failure | Failure | Failure | Failure |
| 28 | do | 1.0 | 10.80 | Failure | Failure | Failure | Failure |
| 29 | α-Terpineol | 0.5 | 10.40 | Failure | Failure | Failure | Failure |
| 30 | do | 1.0 | 10.50 | Failure | Failure | Failure | Failure |

EXAMPLES 31 THROUGH 42

The following examples were run to determine whether the inhibitor of the present invention was effective on commercial blends of polyols with trichloromonofluoromethane at normal room temperatures. This superiority is demonstrated by the results which are tabulated below and which indicate that of the inhibitors tested, only 1-methoxy-4-propenylbenzene remained effective after 576 hours at room temperature.

The polyol:trichloromonofluoromethane weight ratio was 1:2 in all cases.

Table III

| Example | Inhibitor | Weight Percent | pH | | | | | |
|---|---|---|---|---|---|---|---|---|
| | | | At 0 hrs. | At 192 hrs. | At 315 hrs. | At 504 hrs. | At 576 hrs. | At 1,344 hrs. |
| 31 | Control | 0 | 10.30 | Failure | Failure | Failure | Failure | Failure |
| 32 | α-Pinene | 0.5 | 10.0 | 9.2 | 9.1 | 9.0 | Failure | Failure |
| 33 | do | 1.0 | 10.0 | 9.2 | Failure | Failure | Failure | Failure |
| 34 | Dipentene 122 | 0.5 | 10.0 | 9.4 | 9.15 | Failure | Failure | Failure |
| 35 | do | 0.5 | 10.3 | 9.4 | 9.30 | 9.05 | Failure | Failure |
| 36 | 1-methoxy-4-propenylbenzene | 0.5 | 10.1 | 9.70 | 9.42 | 9.30 | 9.35 | 9.10 |
| 37 | do | 1.0 | 10.1 | 9.80 | 9.60 | 9.52 | 9.47 | 9.38 |
| 38 | Steam distilled terpentine | 0.5 | 10.1 | 9.1 | Failure | Failure | Failure | Failure |
| 39 | do | 1.0 | 10.2 | 9.3 | Failure | Failure | Failure | Failure |
| 40 | α-Terpineol | 0.5 | 10.4 | Failure | Failure | Failure | Failure | Failure |
| 41 | do | 1.0 | 10.5 | 9.14 | Failure | Failure | Failure | Failure |
| 42 | do | 1.5 | 10.45 | 9.34 | 9.08 | Failure | Failure | Failure |

EXAMPLE 43

When polyurethane foams are prepared by conventional methods, employing a number of the "failure" polyol trichloromonofluoromethane mixtures from the above examples, the foams are discolored, in many instances are friable and have low strength, and in all cases are markedly inferior in physical properties to those made with polyol-trichloromonofluoromethane mixtures which were inhibited with 1-methoxy-4-propenylbenzene.

EXAMPLE 44

When mixtures of equal parts of trichloromonofluoromethane and Quadrol inhibited with 0.5% by weight of 1-methoxy-4-propenylbenzene are tested after being stored for 5000 hours at room temperature, their pH is found to remain about 9.0 and they are satisfactory for use in polyurethane foams.

EXAMPLE 45

When various non-aminic based polyols are mixed with trichloromonofluoromethane and with appropriate quantities of commercial catalysts, such mixtures which have been inhibited with 0.5% of 1-methoxy-4-propenylbenzene are found to decrease in pH at a much slower rate than identical mixtures not so inhibited.

I claim:

1. A composition of matter comprising trichloromonofluoromethane, from 0.2 to 2.0% by weight of 1-methoxy-4-propenylbenzene based on the weight of the trichloromonofluoromethane and a poly(hydroxyalkyl)polyamine containing from four to five hydroxyl groups.

2. The composition of claim 1 where the polyamine is N′,N,N′,N′-tetrakis(2-hydroxypropyl)ethylenediamine.

3. The composition of claim 1 where the

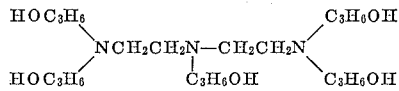

4. A composition of matter consisting essentially of trichloromonofluoromethane, from 0.2 to 2.0% by weight of 1-methoxy-4-propenylbenzene, a poly(hydroxyalkyl)polyamine containing from four to five hydroxyl groups, and a tetrtiary amine catalyst.

5. The composition of claim 4 wherein the polyamine is N,N,N′,N′-tetrakis(2-hydroxypropyl)ethylenediamine.

6. The composition of claim 4 wherein the

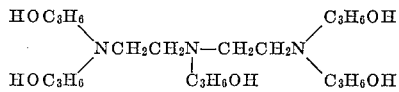

References Cited by the Examiner
UNITED STATES PATENTS
3,137,662  6/1964  Rectenwald _____ 260—2.5

LEON J. BERCOVITZ, *Primary Examiner.*

DONALD E. CZAJA, *Examiner.*